United States Patent
Cornali (10) Patent No.: US 8,180,758 B1
(45) Date of Patent: May 15, 2012

(54) DATA MANAGEMENT SYSTEM UTILIZING PREDICATE LOGIC

(75) Inventor: Del J. Cornali, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 477 days.

(21) Appl. No.: 12/118,463

(22) Filed: May 9, 2008

(51) Int. Cl.
*G06F 7/10* (2006.01)

(52) U.S. Cl. ........................................ 707/707

(58) Field of Classification Search ............... None
See application file for complete search history.

(56) References Cited

U.S. PATENT DOCUMENTS

| | | | |
|---|---|---|---|
| 7,747,640 B2 * | 6/2010 | Dettinger et al. | 707/766 |
| 7,752,243 B2 * | 7/2010 | Hoeber et al. | 707/706 |
| 2002/0091680 A1 * | 7/2002 | Hatzis et al. | 707/3 |
| 2003/0212676 A1 * | 11/2003 | Bruce et al. | 707/5 |
| 2005/0022115 A1 * | 1/2005 | Baumgartner et al. | 715/513 |
| 2005/0278362 A1 * | 12/2005 | Maren et al. | 707/100 |
| 2006/0161528 A1 * | 7/2006 | Dettinger et al. | 707/3 |
| 2007/0174318 A1 * | 7/2007 | Leff et al. | 707/101 |
| 2009/0187542 A1 * | 7/2009 | Begley et al. | 707/3 |
| 2009/0216717 A1 * | 8/2009 | Suereth et al. | 707/3 |
| 2009/0248658 A1 * | 10/2009 | Mika | 707/5 |
| 2009/0254584 A1 * | 10/2009 | Leff et al. | 707/102 |

\* cited by examiner

*Primary Examiner* — Hung Q Pham
*Assistant Examiner* — Hubert Cheung
(74) *Attorney, Agent, or Firm* — Kilpatrick Townsend and Stockton LLP (57) ABSTRACT

A predicate logic corpus can be generated from any number of data sources or data stores. The creation of a predicate logic corpus for information such as metadata allows ascendancy, descendancy, relationship, hierarchical, contextual, and knowledge information to be stored for predicate logic facts generated from information in the data sources. The predicate logic corpus allows for queries to be executed against corpus logic facts in the corpus and in results sets of the corpus, allowing for iterative and complex natural language queries to be submitted and executed without a substantial drain on resources.

23 Claims, 4 Drawing Sheets

DATA MANAGEMENT SYSTEM UTILIZING PREDICATE LOGIC

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present disclosure relates generally to, among other things, the generation, maintenance, and use of data, metadata, and/or various data structures. As the amount of such information stored electronically continues to increase dramatically, approaches for managing this increasing amount of data become evermore important. Data typically is stored in a data storage using a two-dimensional approach, with each item of data corresponding to a row in at least one table that includes entries in respective columns of information. The mapping or other linking between tables provides the ability for the data to be linked to various other data, organizations, classifications, etc. The linking of various tables at different levels can thus produce a hierarchy of information relating to each stored data item. In order to attempt to provide some context for the data, metadata can be stored that provides additional information for each stored data item. For example, metadata might be used to associate a data item with one or more categories of data, as well as to provide information about those categories.

In an environment such as an electronic marketplace, for example, a data store might contain an enormous amount of "metadata" about items offered through the marketplace, including metadata for the types of items offered, attributes of those items, etc. Knowledge of that metadata typically is locked away into a fairly complex data store, such that even though an extensive tool set can provide access to this metadata, the view of the metadata is limited to a database orientation. In one example, JAVA® application programming interfaces (APIs) provide only a limited view of the system's knowledge of metadata, as standard database queries are relatively limited and represent only unit-level steps of the end-user's query (JAVA® is a general-purpose, concurrent, class-based, object-oriented language). A user is able to navigate through the data hierarchy to find particular information, such as item type and attributes for that item type. The user can view and update this information in a transactional fashion. The process does not obtain knowledge or context for the information being searched, and only satisfies a series of queries by getting and setting various attributes. Further, the process has to step through each transaction to obtain information about metadata, and there is no way to otherwise execute a multi-transactional query without stepping through each individual transaction. For example, there is no simple way to obtain information for all item types under (directly or indirectly) a consumer electronics category which have a particular attribute set to a particular value.

Further, the cost to develop and maintain these tools is high, and most significantly the tools can only give brief glimpses into the data. Existing data stores can be huge, unwieldy, time-and-computationally expensive, and still only provide a rather limited way to represent or express knowledge about the metadata itself, without any way to prove the knowledge about the metadata.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to managing information in an electronic environment. The information can include, or relate to, any appropriate content desired to be stored electronically. As used herein, the term "content" can refer to anything that can be displayed, stored, manipulated, reported on, analyzed, or otherwise conveyed to a user, such as through a graphical user interface (GUI) or programmatic interface, in response to a request from the user or other entity. A request relating to the content can include any appropriate request sent through an appropriate system or network, such as a request sent to an Enterprise server over a local area network (LAN), a request submitted via a Web page over the Internet, or a message sent via a messaging system to a content provider, for example.

Figure 1:
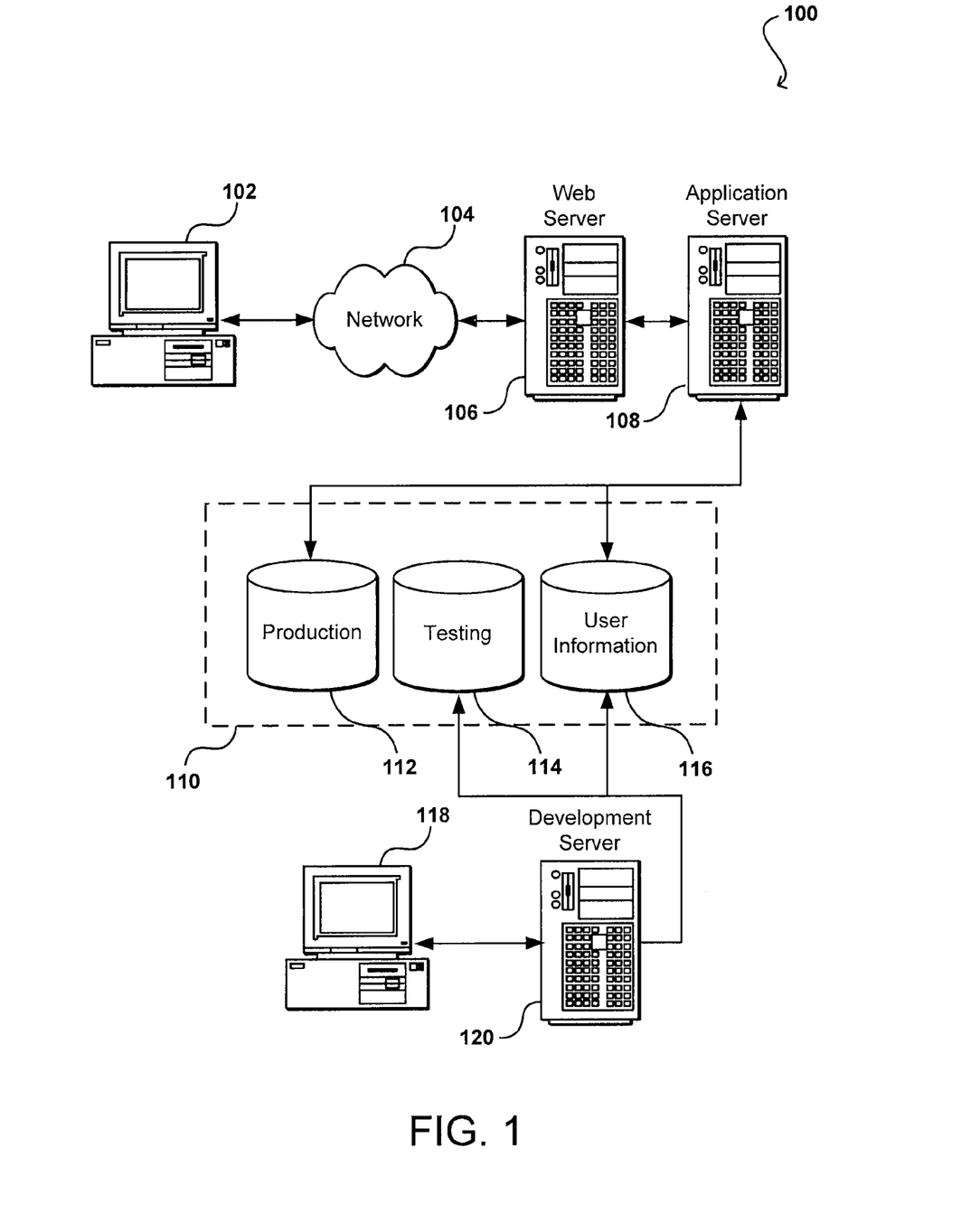
FIG. 1 illustrates a general system configuration that can be used in accordance with one embodiment.

FIG. 1 illustrates an example of an environment 100 for implementing aspects in accordance with various embodiments. As will be appreciated, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML for at least one Web page using hypertext transfer protocols. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server can include an operating system that provides executable program instructions for the general administration and operation of that server, and includes a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Aspects of the various embodiments can be utilized on the production side or the development side. These aspects also can be used in other environments, where there may not be such a separation, or where there may be other portions such as a dedicated test server (not shown) or other such devices. Arrangements for testing development and production code are known in the art and will not be discussed herein in detail.

A user in such an environment might want to obtain information from at least one data store that satisfies a complex question, from a query standpoint. For example, a user might want to submit a "mental" query, or complex query in natural language, such as:

"Please show all the merchant-facing attributes shared between the productType 'typewriter' and ANY productType descended from 'camera'"

A user interface to an application such as a metadata editor running on a client device would typically be the main tool for the end-user to resolve this complex query. The query is not actually handled directly by the editor, however, as the editor instead executes a set of editor-based transactions, none of which are aware of any previous transactions as there is no persistence between individual transaction queries. A metadata management system, for example, thus cannot know what the end-user is really attempting to discover, but can only analyze the individual transaction queries as those queries are submitted by the editor. While such a metadata management system can effectively organize the data that is stored, there is no way to obtain additional knowledge about the metadata. Although the arrangement of items into a hierarchy of product types, for example, provides some interrelation between the data, this still provides only a rather limited way to represent or express knowledge about the metadata itself.

Various technologies exist that provide the mechanisms needed to derive and maintain knowledge about data, and to prove facts and knowledge determined from the data. One such technology takes a predicate logic-based approach, using an artificial intelligence (AI) language such as Prolog, Mandarax, or LISP. For purposes of simplicity of explanation, Prolog will be used in various examples presented herein, but it should be understood that any other appropriate predicate logic or similar approach can be used as would be apparent to one of ordinary skill in the art in light of the teachings and suggestions contained herein.

A predicate logic approach can be used to define logic about a particular item, and then ask for the probability of the logical conclusion. A predicate logic notation can be used that describes, in an example for a data store including data and metadata for products in an electronic marketplace, information such as product types (and their properties), product type hierarchies, attributes and properties, components, valid values, etc. Such notation can be used to create a predicate query, which can be used with system counterparts such as application programming interface (API) calls and Structured Query Language (SQL) queries to obtain the knowledge in the system. In order to take advantage of predicate logic in various situations, however, it can be desirable to provide a way to build upon this knowledge beyond the atomic-level concepts described above. In such cases, it can be desirable to, for example, be able to save useful queries and transform these queries into building blocks, allowing for higher level concepts that can then be used by other users.

The following provides a basic example of a knowledge base comprised of elemental facts representing family relationships. Each of the predicates below represents a fact known to the system:

sister(mary, jennifer)
    sister(sarah, emma)
    parent(emma, mary)
    parent(brianna, sarah)

The knowledge-base can understand two elemental predicates: sister(Person1, Person2) and parent(Parent, Child). This knowledge of relationships can be extended by expressing, through predicate logic, new relationships such as aunt (Aunt, Person) based on the existing axioms of the system. For example, the aunt relationship can be defined using rules, such as:

aunt(Aunt, Person):—
        sister(Aunt, Parent),
        parent(Parent, Person).

By combining the facts, it can be proven that a person is an aunt to someone else, such as Sarah being an aunt to both Mary and Jennifer in the example above. Using this rule, a large number of facts can be analyzed to quickly determine any aunts for a particular user. Such a determination using conventional approaches and simple transaction-based queries could be extremely costly from a time and resources standpoint. A similar approach then can be used for reasoning about metadata, as a platform can be provided where users are able to build persistent and complex relationships, and create simple or complex queries based upon these new constructs.

In order to build such a predicate logic-style knowledge base for metadata the facts about metadata are, in some embodiments, extracted from the tables of the data store and stored as discoverable facts. For example, information such as product types, attributes of product types, and similar information can be queried from the data store and stored as facts according to a predicate logic inference engine to build a "corpus" or body of knowledge about metadata that then can be queried using a predicate-style approach. A user interface also can be provided that allows for the evolution of a predicate logic-based language about metadata. Users can create result sets of various metadata concepts, such as may include product types, product attributes, components, valid values, and enumerated values. Users can compound knowledge beyond the elements of existing metadata concepts into more complex constructs, and can utilize a notation to express complex queries against this knowledge. A set of predicate-logic constraints then can be transformed into SQL database queries and result sets can be constructed that unify the query variables against the SQL results. In one embodiment, a technology such as JAVA® Server Faces (JSF) can be used to provide a user interface able to capture complex user queries and present both interim and final result sets. In other embodiments, an open-source framework such as Struts, available from the Apache Software Foundation, or a JAVA® API such as Swing, available from Sun Microsystems, Inc. of Santa Clara, Calif., can be used to create the user interface as part of a JAVA® web application.

In order to better understand an implementation of such an approach, the following notation and base axioms will be used to describe a knowledge base in accordance with one embodiment. An exclamation mark is a used to cut the search space following the previous unification. For example, to unify Elemental(X) against Elemental(attribute(Y)), if X unifies attribute(Y) there is no need to attempt to unify X against productType, component, or any other yet-to-be-determined elemental:

Elemental(attribute(Attribute)):—
        attribute(Attribute), !.
    Elemental(productType(ProductType)):—
        productType(ProductType), !.
    Elemental(component (Component)):—
        component (Component),
        !.

Once the existence of elementals is defined, the knowledge of these elementals can be expanded by defining the properties that any of the elementals may possess. Thus,     property(Elemental(X), Name, Value).

for example, property(attribute(binding), type, enumerated).

The productTypeRelation fact provides for reasoning about the product type hierarchy. The knowledge base thus states the direct parent-child relationship between two product types as:

productTypeRelation(ParentPT, ChildPT).

The knowledge base thus derives the productTypeDescendant rule based on the productTypeRelation facts. So,     productTypeDescendant(ProgenitorPT ChildPT):—
        //recursion base
        productTypeRelation(ProgenitorPT, ChildPT),
        !.
    //or, if this goal fails, recurse through the hierarchy productTypeDescendant(ProgenitorPT, GrandChildPT):—
        productTypeRelation(ProgenitorPT, Child),
        productTypeDescendant(Child, GrandChildPT).

Another facet to capture is the relationship between product types and attributes. For example:

productTypeAttribute(ProductType, Attribute).

Using this basic set of logical components, queries can be fashioned against the knowledge base. A sample query to find all shared attributes between 'typewriter' and descendants of 'camera', for example, might turn into the following query, where Attribute is the input parameter, and Set is the query result:

mf_camera_rule(set):—
        //ensure these product types actually exist
        productType(typewriter),
        productType(camera),
        //collect all results
        findall(Attribute,
            mf_camera_rule_base(Attribute), //satisfying this
            rule Set).
    mf_camera_rule_base(Attribute):—
        productTypeAttribute(typewriter, Attribute),
        productTypeDescendant(camera, _DescendantOfCamera),
        productTypeAttribute(_DescendantOfCamera,
            Attribute).

The 'findall' predicate assembles all of the attribute names into an array, each of which represents a solution to the mf_camera_rule_base/1 rule.

Thus, a rule mf_camera_rule(set) can be formalized to find all the shared attributes between 'typewriter' and descendants of 'camera'. Facts can be discovered by querying the data store, and a result set can be obtained using rules such as productTypeDescendant described above. Users also are able to create and fashion their own rules, which further can be saved and shared. Thus, a very large scale language begins to take shape regarding how to describe and find data. A GUI front end can be provided that is built upon this predicate knowledge, so that the users do not have to learn predicate logic but can instead build, save, and otherwise manipulate queries through a natural language interface.

Such an approach provides a representation that is expanded beyond the elemental database views of knowledge, and enables users to formulate logical queries against the knowledge of metadata. Such knowledge queries can be differentiated from standard database queries in one aspect through the use of result sets. These result sets are collections of related data across various metadata entities, such as product types, attributes, components, valid values, and every new construct introduced into the metadata environment.

Figure 2:
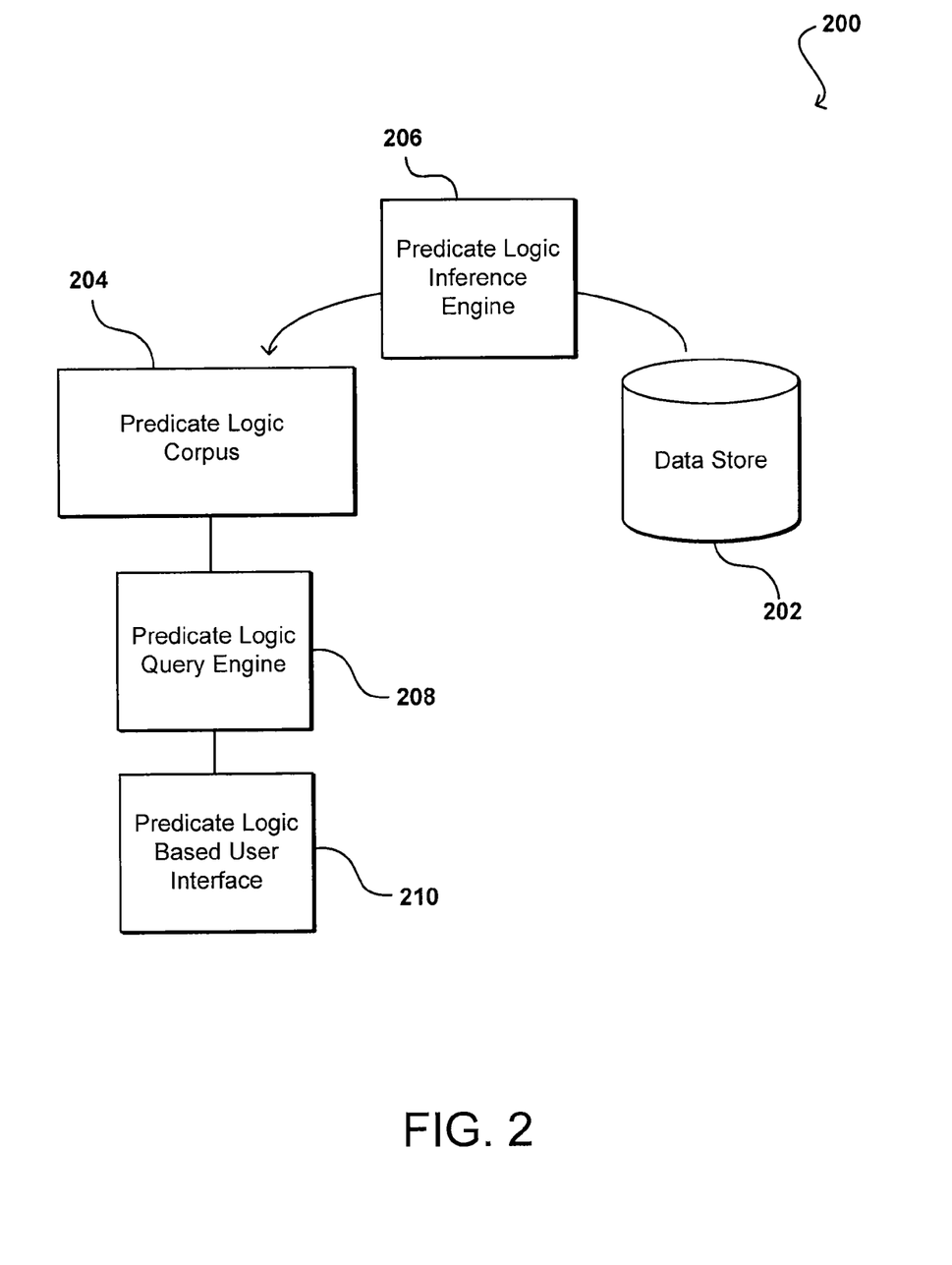
FIG. 2 illustrates a components of a predicate logic corpus building system that can be used in accordance with one embodiment.

FIG. 2 illustrates an overview 200 of elements of a predicate logic approach that can be used in accordance with one embodiment. As shown, a data store 202 contains data and metadata stored in standard tables (or other existing approaches) as known in the art. In order to extract the relevant information and generate a predicate logic corpus of facts 204, a predicate logic inference engine 206 is used to convert normal SQL (or other such) queries into queries that can be used to generate predicate logic facts. The engine can take advantage of a number of rules to generate the fact corpus. The facts are then used to build the predicate logic fact-based corpus of knowledge 204. Once the corpus is established, a predicate logic query engine 208 can provide a user interface component 210 that allows users to explore the facts without performing standard SQL queries or other transaction-based queries. The users are also able to define new rules and/or use existing result sets to take advantage of knowledge of the corpus.

The predicate logic inference engine, which can be a JAVA® program, for example, can be automated to generate the necessary inferences and mappings between standard data such as SQL tables and columns and predicate logic facts. The engine then can be used to extract the desired information from any appropriate data source and generate a predicate logic fact corpus. Further, the inference engine 206 can be used to determine updates or deltas to the data store 202, for example, and automatically update that information in the fact corpus 204 in order to ensure synchronization therebetween. Methods for determining and scheduling update synchronization are known in the art and will not be discussed herein in detail.

As discussed, one potential advantage of using a fact corpus 204 is that users are able to query against the fact corpus using user-defined rules. Further, users are able to further query or write rules against given result sets from the corpus. This can be advantageous in many situations, as it often is the case that the need for specific data happens incrementally. By being able to apply additional rules to existing result sets, there is no need to re-write a rule and re-run the entire query process. Such an approach thus potentially saves time and resources. A user is able to refine the results as necessary by applying additional rules, which can be quite powerful and can work within the predicate logic realm. A user also can search for existing rules or result sets to further refine results as needed.

In one embodiment, the predicate logic inference engine 206 is a JAVA® program that queries the SQL to describe a table in the data store 202. The inference engine then builds the predicate logic facts using the returned column names. Such an approach is one possible way to generate a corpus 204, but most data in the data store will not be of interest. Another inference engine can include a meta interpreter than can extract particular columns from particular tables and use those to generate specific facts. Such an approach can thereby extract only a meaningful subset of the data. This is not trivial, as data stores typically manage data in a two-dimensional approach (e.g., columns within the rows). Metadata is often hierarchical in nature, such that different rows corresponding to different product types might have a common parent. Obtaining such relationship information out of the data store can be difficult or at least very expensive, as each relationship in the data store would need to be analyzed individually. Further, instead of just a list of data or metadata having a common parent in a data table, for example, a user may prefer to obtain the entire hierarchy of relationships, and to be able to store that hierarchy as a tree of information. To do this for a general table using conventional approaches can be very difficult.

The user interface (UI) component 210 can also be used as a discovery tool to discover information about the data. For example, in an electronic marketplace the catalog of items can be quite large and difficult to navigate. It often is the case that it is far easier to create new data than to locate existing but related data that already exists in the data store. Consequently, there often are entries, categories, items, etc., created in the data store that are essentially duplicates but are different in name, for example, and are not linked to each other in the data store. Since there is no easy way to determine context in the existing data store, it can be difficult to locate and determine these duplicates. It can also be difficult to determine other relationships between the data, such as attributes that are shared between books and other printed media. Using a predicate logic-based approach, as described herein, can potentially allow such determinations to be executed much more quickly and can eliminate many of the duplicates, unused attributes, etc., that would otherwise exist. Technologies such as SQL do not provide tree traversal ability at any subsequent time. Relationship information can be determined, but SQL does not provide a hierarchical or tree structure that can be used in a useful way. By generating a fact corpus, a user can instead query the corpus, which provides the ascendancy and descendancy information. For example, simple queries can be written that find all common grandchildren, which might enormously computationally expensive using a technology such as SQL, as SQL arranges the data in a matrix and not in a tree.

Such approaches can be used with other data sources as well. For example, data stored in the form of extensible markup language (XML) documents can be retrieved and parsed to generate predicate logic facts. Information from various XML documents can then be related in this way in the corpus. Data can also come from multiple data sources, such as disparate databases, and can be merged into the corpus. For example, two databases might store different information about people, where the people included in the databases overlap. Such an approach allows information to be merged in an intelligent way from any appropriate data source.

Figure 3:
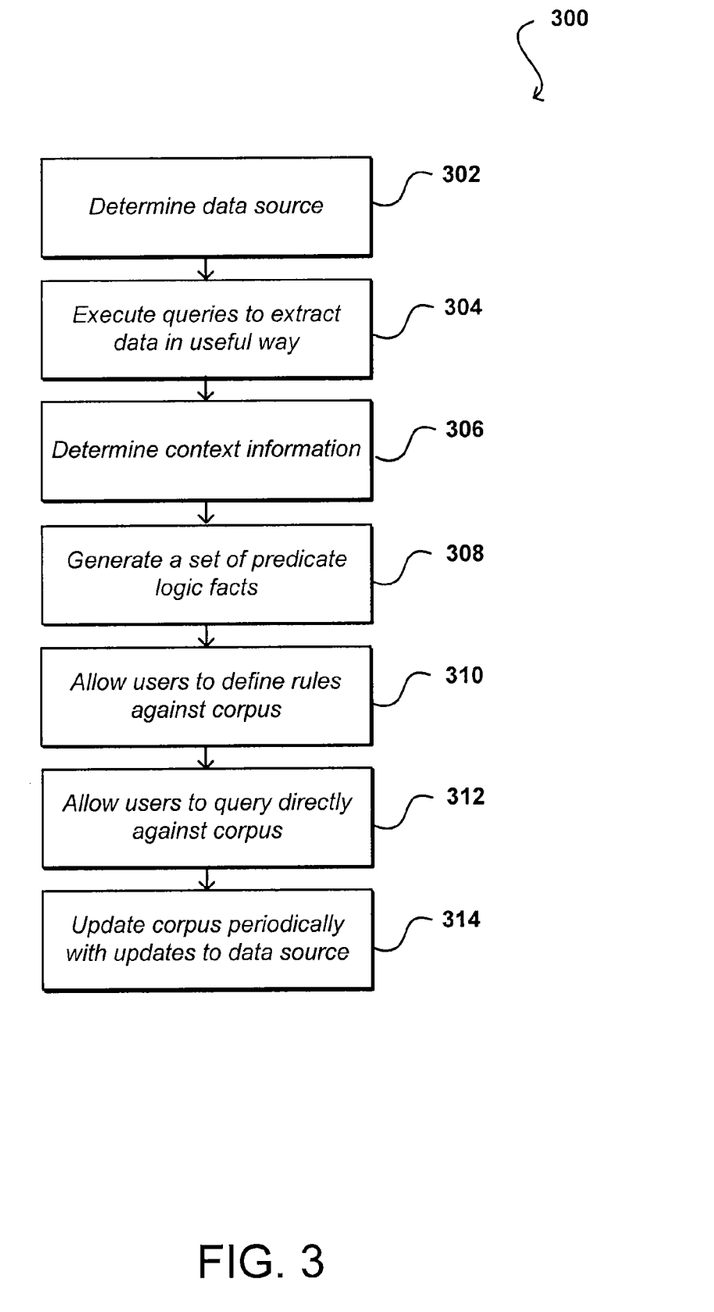
FIG. 3 illustrates steps of an approach to building a predicate logic corpus that can be used in accordance with one embodiment.

FIG. 3 illustrates an approach 300 to generating predicate logic corpus from any number of data sources that can be used in accordance with one embodiment. In this approach, at least one data source is determined from which data and/or metadata is to be added to a predicate logic corpus 302. As discussed above, the data sources can be any appropriate data store or data source, and may not otherwise be compatible with each other or can use completely disparate data structures, and typically will have no relationships defined between data stored therein. A series of queries can be used to extract a desired set of records from each source in a meaningful way that can be used to generate predicate logic facts and relationships 304. Inferences are made between the data and metadata in order to determine relationships and context needed for the corpus 306. The extracted data and/or metadata, along with the inferred relationships and context, are used to generate a set of predicate logic facts to be added to the predicate logic corpus 308. Once the corpus is created, users are able to define rules against the predicate logic facts stored therein 310. Users also are able to query directly against the predicate logic corpus taking advantage of the user-defined rules 312. Updates to each data source can be tracked so that the corpus can be periodically updated in order to ensure synchronization and accuracy of the predicate logic corpus 314.

Figure 4:
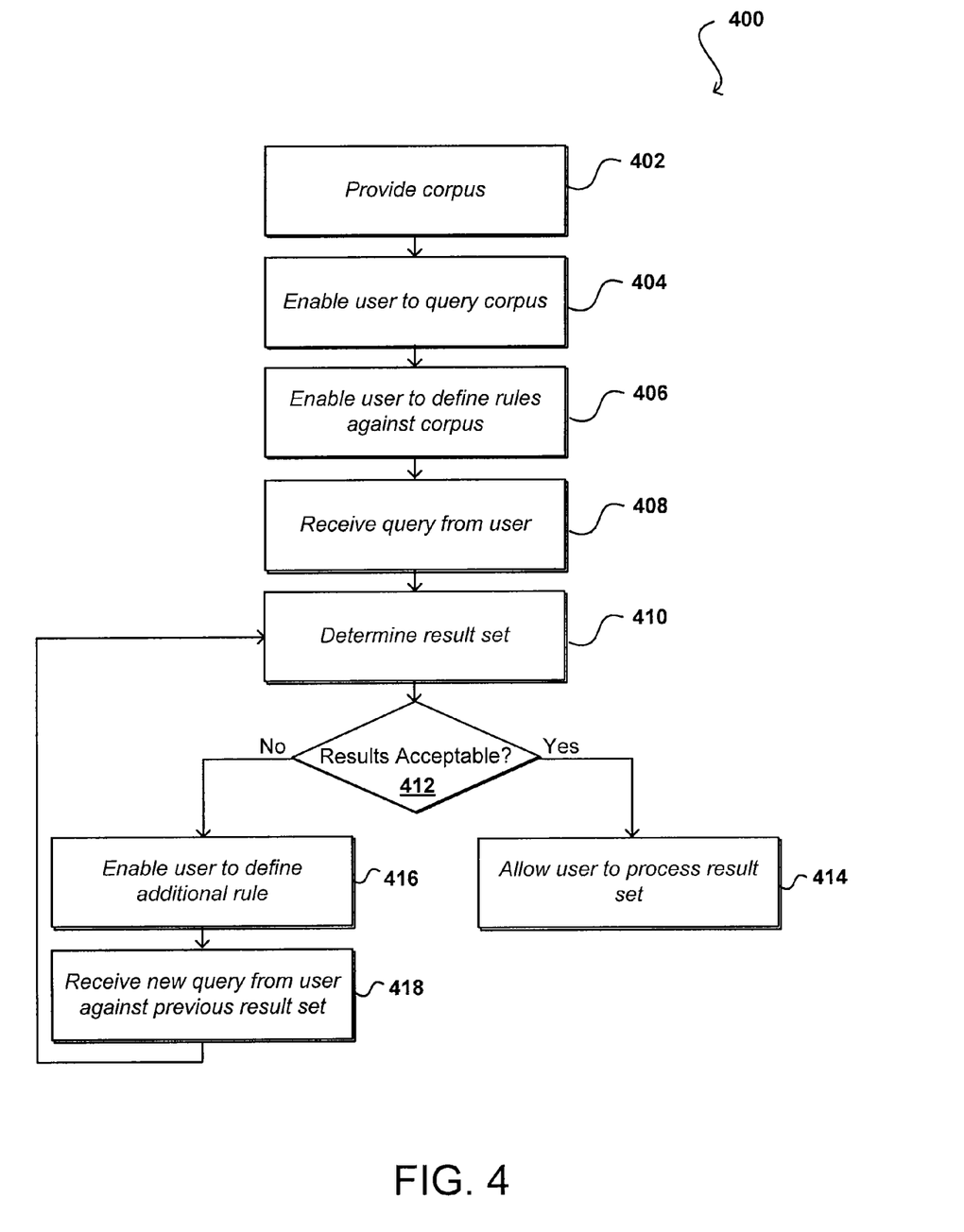
FIG. 4 illustrates steps of an approach to utilizing a predicate logic corpus that can be used in accordance with one embodiment.

FIG. 4 illustrates steps of an approach 400 for taking advantage of the predicate logic corpus that can be used in accordance with one embodiment. Using an approach such as that discussed with respect to FIG. 3, a predicate corpus is provided that stores data and/or metadata as a hierarchy of predicate logic facts 402. An interface is provided that allows users to query the predicate logic corpus, such as by using natural language or predicate logic notation 404. A user also is able to use the interface to define rules against the corpus 406. When a query is received from a user 408, the query is executed against the corpus and a result set is generated to be presented to the user 410. If the result set is acceptable to the user 412, then the user can export, analyze, or otherwise process the result set 414. If the result set is not acceptable, then the user can define at least one additional rule 416 and can submit a new query against the result set to generate a new result set 418. The process can continue iteratively, allowing a user to keep refining the result set, until the desired result set is obtained.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and APPLETALK®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, JAVA® servers, and business application servers. The server(s) also may be capable of executing programs or scripts in response requests from user devices, such as by executing one or more Web applications that may be implemented as one or more scripts or programs written in any programming language, such as JAVA®, C®, C#® or C++®, or any scripting language, such as Perl®, Python®, or TCL®, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing a predicate logic corpus, comprising:
   under control of one or more computer systems configured with executable instructions,
      determining at least one source of metadata;
      executing a series of Structured Query Language (SQL) queries against each determined source of metadata to extract a desired set of metadata;
      determining context information for the extracted set of metadata using a predicate logic inference engine;
      storing the extracted set of metadata as a corpus of predicate logic facts according to the determined context information;
      providing a user interface enabling a user to define rules against the predicate logic facts in the corpus, and further enabling the user to execute queries against the corpus and any result set in the corpus, the queries being written in at least one of a natural language or a predicate logic notation, wherein the predicate logic notation includes an artificial intelligence language notation;
      receiving a first query that is created and submitted via the user interface;
      in response to receiving the first query,
         executing the first query against the corpus of predicate logic facts obtained through the determined context information; and
         generating a first result set to be presented to the user, the generated first result set including at least one predicate defining a hierarchical relationship between data elements of the corpus; and
      receiving a second query that is created and submitted via the user interface, the second query including at least one new rule defined by the user to be applied against the generated first result set via the user interface;
      in response to receiving the second query,
         executing the second query against the generated first result set; and
         generating a second result set to be presented to the user, the generated second result set being based at least in part on the generated first result set,
         wherein when the generated first result set includes at least one set of duplicate data elements, the generated second result set excludes the at least one set of duplicate data elements, the at least one set of duplicate data elements being excluded based at least in part on the defined hierarchical relationship between the data elements of the corpus included in the generated first result set and the at least one set of duplicate data elements.

2. The computer-implemented method according to claim 1, wherein:
   the predicate logic notation is a Prolog-based notation.

3. The computer-implemented method according to claim 1, further comprising:
   inferring context information not otherwise stored in each determined source of metadata.

4. A computer-implemented method, comprising:
   under control of one or more computer systems configured with executable instructions,
      executing a series of queries against a source of information to extract a desired set of information;
      determining context information for the extracted set of information;
      storing the extracted set of information as a corpus of predicate logic facts according to the determined context information;
      receiving a first query that is created and submitted via a user interface;
      in response to receiving the first query submitted via the user interface,
         executing the first query against the corpus of predicate logic facts obtained through the determined context information; and
         generating a first result set to be presented to a user, the generated first result set including at least one predicate defining a hierarchical relationship between data elements of the corpus; and
      receiving a second query that is created and submitted via the user interface, the second query including at least one new rule defined by the user to be applied against the generated first result set via the user interface;
      in response to receiving the second query,
         executing the second query against the generated first result set; and
         generating a second result set to be presented to the user, the generated second result set being based at least in part on the generated first result set,
         wherein when the generated first result set includes at least one set of duplicate data elements, the generated second result set excludes the at least one set of duplicate data elements, the at least one set of duplicate data elements being excluded based at least in part on the defined hierarchical relationship between the data elements of the corpus included in the generated first result set and the at least one set of duplicate data elements.

5. The computer-implemented method according to claim 4, wherein:
   the predicate logic notation is a notation based on one of Prolog, Manadarax, and LISP.

6. The computer-implemented method according to claim 4, wherein:
   the user interface enables the user to develop a predicate logic-based language about the information.

7. The computer-implemented method according to claim 4, wherein:
   the user interface relies at least in part on at least one of JAVA Server Faces (JSF), Struts, and Swing components.

8. The computer-implemented method according to claim 4, further comprising:
   enabling the user to define a rule against the predicate logic facts in the corpus.

9. The computer-implemented method according to claim 4, wherein:
the user is further able to define rules and execute additional queries against the generated first result set.

10. The computer-implemented method according to claim 4, wherein:
the source of information is queryable at a data level; and
the corpus is queryable at a contextual level.

11. The computer-implemented method according to claim 4, wherein:
the context information that is determined for the corpus is provable using the stored corpus of predicate logic facts and predicate logic rules.

12. The computer-implemented method according to claim 4, wherein:
the source of information includes metadata.

13. The computer-implemented method according to claim 4, wherein:
the predicate logic facts include facts relating to at least one of product types, product type attributes, components, valid values, and enumerated values.

14. The computer-implemented method according to claim 4, further comprising:
transforming predicate logic constraints from the corpus into structured query language (SQL) database queries that are able to be executed against the source of information.

15. The computer-implemented method according to claim 4, wherein:
the determining the context information for the extracted set of information is accomplished using a predicate logic inference engine configured to generate inferences and mappings between the information in the source and the predicate logic facts in the corpus.

16. The computer-implemented method according to claim 4, further comprising:
periodically updating the corpus based on updated information in the source of information.

17. The computer-implemented method according to claim 4, further comprising:
extracting information from multiple disparate sources and determining relationship and context information therebetween.

18. The computer-implemented method according to claim 4, wherein:
the context information includes relationship information, the relationship information specifying at least one of ascendancy, decendancy, and related attribute information for determining the predicate logic facts.

19. A computer system, comprising:
a processor; and
a memory device including instructions that, when executed by the processor, cause the processor to:
execute a series of queries against a source of information to extract a desired set of information;
determine context information for the extracted set of information;
store the extracted set of information as a corpus of predicate logic facts according to determined relationships and the determined context information;
receiving a first query that is created and submitted via a user interface, the first query defined in at least one of a natural language or a predicate logic notation, wherein the predicate logic notation includes an artificial intelligence language notation;
in response to receiving the first query submitted via the user interface,
execute the first query against the corpus of predicate logic facts obtained through the determined context information; and
generate a first result set to be presented to a user, the generated first result set including at least one predicate defining a hierarchical relationship between data elements of the corpus; and
receiving a second query that is created and submitted via the user interface, the second query including at least one new rule defined by the user to be applied against the generated first result set via the user interface;
in response to receiving the second query,
execute the second query against the generated first result set; and
generate a second result set to be presented to the user, the generated second result set being based at least in part on the generated first result set,
wherein when the generated first result set includes at least one set of duplicate data elements, the generated second result set excludes the at least one set of duplicate data elements, the at least one set of duplicate data elements being excluded based at least in part on the defined hierarchical relationship between the data elements of the corpus included in the generated first result set and the at least one set of duplicate data elements.

20. The computer system according to claim 19, wherein the memory device further includes instructions that, when executed by the processor, cause the processor to:
enable the user to define a rule against the predicate logic facts in the corpus.

21. A non-transitory computer readable storage medium having computer-executable instructions stored thereon that, when executed on a computer, cause the computer to:
execute a series of queries against a source of information to extract a desired set of information;
determine context information for the extracted set of information;
store the extracted set of information as a corpus of predicate logic facts according to the determined context information;
receiving a first query that is created and submitted via a user interface, the first query defined in at least one of a natural language or a predicate logic notation, wherein the predicate logic notation includes an artificial intelligence language notation;
in response to receiving the first query submitted via the user interface,
execute the first query against the corpus of predicate logic facts obtained through the determined context information; and
generate a first result set to be presented to a user, the generated first result set including at least one predicate defining a hierarchical relationship between data elements of the corpus; and
receiving a second query that is created and submitted via the user interface, the second query including at least one new rule defined by the user to be applied against the generated first result set via the user interface;
in response to receiving the second query,
execute the second query against the generated first result set; and
generate a second result set to be presented to the user, the generated second result set being based at least in part on the generated first result set, wherein when the generated first result set includes at least one set of duplicate data elements, the generated second result set excludes the at least one set of duplicate data elements, the at least one set of duplicate data elements being excluded based at least in part on the defined hierarchical relationship between the data elements of the corpus included in the generated first result set and the at least one set of duplicate data elements.

22. The non-transitory computer readable storage medium according to claim 21, wherein the computer-executable instructions further cause the computer to enable the user to define a rule against the predicate logic facts in the corpus.

23. The non-transitory computer readable storage medium according to claim 21, wherein the computer-executable instructions further cause the computer to enable the user to define rules and execute additional queries against a result set generated as a result of a query executed against the corpus.

* * * * *